United States Patent [19]

Hoover

[11] Patent Number: 4,890,854

[45] Date of Patent: Jan. 2, 1990

[54] HITCH PIN

[76] Inventor: Steven J. Hoover, 7331 W. County Rd. 38, Fostoria, Ohio 44830

[21] Appl. No.: 238,593

[22] Filed: Aug. 31, 1988

[51] Int. Cl.$^4$ .............................................. B60D 1/02
[52] U.S. Cl. ..................................... 280/504; 24/303; 280/515; 292/251.5; 403/DIG. 1; D8/382
[58] Field of Search ................... 280/515, 504; 403/DIG. 1; D8/382; 292/251.5; 24/303, 49 M, 94

[56] References Cited

U.S. PATENT DOCUMENTS

| D. 240,396 | 7/1976 | Gray | D8/382 |
|---|---|---|---|
| 389,037 | 9/1888 | Wilkinson | 24/31 |
| 2,367,874 | 1/1945 | Kelley et al. | 280/515 X |
| 2,436,210 | 2/1948 | Fuhrer | 280/515 X |
| 2,454,856 | 11/1948 | Bible | 280/515 |
| 2,483,111 | 9/1949 | Spillman | 280/515 X |
| 2,627,423 | 2/1953 | Copeman | 280/515 |
| 2,757,021 | 7/1956 | Moon | 280/515 |
| 3,011,801 | 12/1961 | Neumann | 280/515 |
| 3,197,239 | 7/1965 | Jezek, Jr. | 280/515 |
| 3,572,766 | 4/1971 | Jezek | 280/515 |
| 3,865,407 | 2/1975 | Klassen | 280/515 |
| 4,087,112 | 5/1978 | Lee, Jr. | 280/515 |
| 4,526,396 | 7/1985 | Mayer | 280/515 |

Primary Examiner—Mitchell J. Hill
Attorney, Agent, or Firm—David C. Purdue; John C. Purdue

[57] ABSTRACT

An improved hitch pin assembly for releasably connecting a towed vehicle to a towing vehicle is disclosed. The hitch pin assembly includes a shaft and a generally C-shaped retaining arm, one end of which is pivotally supported at the top of the shaft for rotation between a first position in which it locks the pin in place in service and a second position in which it does not interfere with the removal of the pin. A magnet is positioned on the pin to retain the arm in the first position under most service conditions. The other end of the C-shaped arm includes a foot portion or guide bars to restrict that end from lateral movement relative to the shaft.

6 Claims, 2 Drawing Sheets

HITCH PIN

BACKGROUND OF THE INVENTION

1. Field of the Invention

This invention relates to a hitch pin for releasably connecting a towing vehicle, such as a farm tractor, to a towed vehicle, such as a wagon. Typically, a towing vehicle is provided with a hitch plate structurally attached to the frame of the towing vehicle. A vertically oriented aperture is provided in the hitch plate for receiving a hitch pin. Corresponding apertures are provided in the forks of a yoke on a towed vehicle such that they can be aligned with the hitch plate aperture and the hitch pin inserted therethrough, thereby operatively connecting the vehicles.

2. Description of the Prior Art

Hitch pins including a generally C-shaped retaining arm are disclosed in a number of U.S. Pat. Nos. including D240,396, 2,367,874, 2,436,210, 2,454,856, 2,483,111, 2,757,021, 3,011,801, 3,197,239, 4,087,112 and 4,526,396. U.S. Pat. No. 2,436,210 discloses a resilient spring catch for selectively maintaining the retaining arm in a locked position. U.S. Pat. Nos. 2,483,111 and D240,396 disclose a hitch pin including a retaining arm which is maintained in a locked position by gravity. The remaining patents in the foregoing list disclose various spring arrangements for selectively maintaining a retaining arm in a locked position to hold an associated hitch pin in place.

U.S Pat. No. 2,627,423 discloses a hitch pin including a "bolt having a magnetic head which holds it securely in place regardless of the angle of pull or roughness of terrain." (col. 1, lines 22 through 24).

SUMMARY OF THE INVENTION

The present invention is based upon the discovery of an improved hitch pin of the type including a generally C-shaped retaining arm pivotally supported at the top of the pin for rotation between a first position in which it locks the pin in place in service and a second position in which it does not interfere with the removal of the pin. According to the invention, a magnet is positioned to retain the arm in the first position under most service conditions. In the event an obstacle is encountered in service, which obstacle overcomes the magnetic attraction, the arm can pivot out of the way until the obstacle is passed, whereupon the arm is free to rotate back to the first position where magnetic attraction will be re-established.

DETAILED DESCRIPTION OF THE INVENTION

Figure 1:
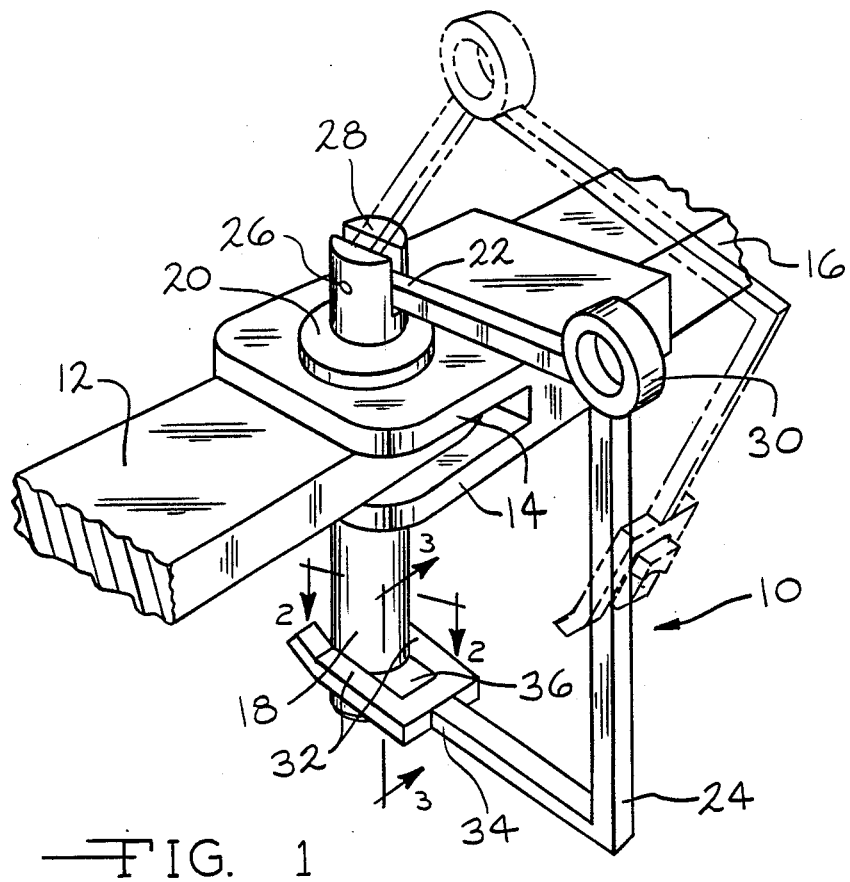
FIG. 1 is a perspective view of a hitch pin according to one embodiment of my invention.

With reference to FIG. 1, one embodiment of a hitch pin is indicated generally at 10. The pin 10 is operatively connecting a hitch plate 12 of a towing vehicle (not shown) to forks 14 of a yoke 16 of a towed vehicle. A central shaft 18 of the pin 10 extends through apertures (not shown) provided in the hitch plate 12 and the forks 14 of the yoke 16. A collar 20 is secured, for example, by welding, to the central shaft 18. The collar 20 has a diameter large enough to prevent the pin 10 from falling through the apertures in the forks 14 and the hitch plate 12.

A first end 22 of a C-shaped retaining arm 24 is pivotally mounted on a pin 26 carried in a first, upper end 28 of the central shaft 18. The C-shaped arm 24 is mounted on the pin 26 for pivotal movement between a first, retaining position, illustrated in FIG. 1, and a second, release position illustrated in phantom lines in FIG. 1. A ring 30 is formed in the arm 24 to facilitate one grasping the arm 24 to move it from the retaining position to the release position. Alternatively, a rope or chain (neither is illustrated) can be secured to the ring 30 so that a driver of a towing vehicle could release the hitch pin 10 from the driver's seat of the towing vehicle.

Figure 2:
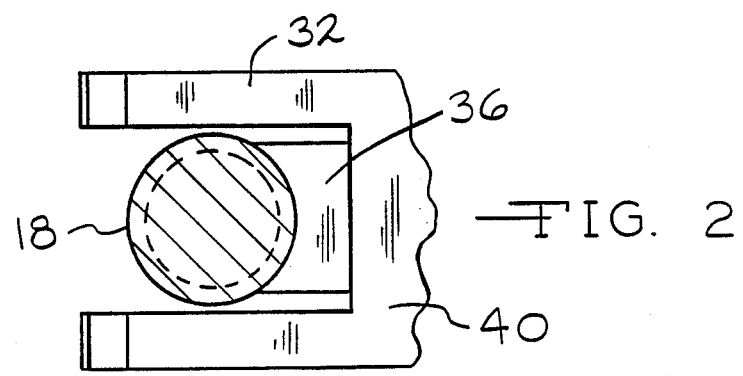
FIG. 2 is a cross sectional view of the hitch pin shown in FIG. 1, taken along the line 2—2.

Two guide bars 32 are provided at a second end 34 of the arm 24. When the arm 24 is in the first position, the guide bars 32 straddle the central shaft 18. The guide bars 32 serve to position the arm 24 and prevent undue torsional strain on the pin 26, in service. As shown in FIG. 2, a small clearance is provided between the central shaft 18 and each of the guide bars 32. The clearance assures easy movement of the arm 24 into the retaining position, especially when the arm 24 has been displaced by some obstruction, in service, from the retaining position. When the pin 10 clears the obstruction, the arm 24 can freely pivot back to the retaining position in which the guide bars 32 straddle the central shaft 18.

With further reference to FIG. 2, a magnet 36 is mounted on the arm 24, between the guide bars 32 and adjacent the second end 34 of arm 24. The magnet 36 is secured by means of a threaded fastener 38 (FIG. 3) to a cross-piece 40 which extends between and is integral with the guide bars 32. The cross-piece, in turn, is secured, as by welding, to the second end 34 of the arm 24.

Figure 3:
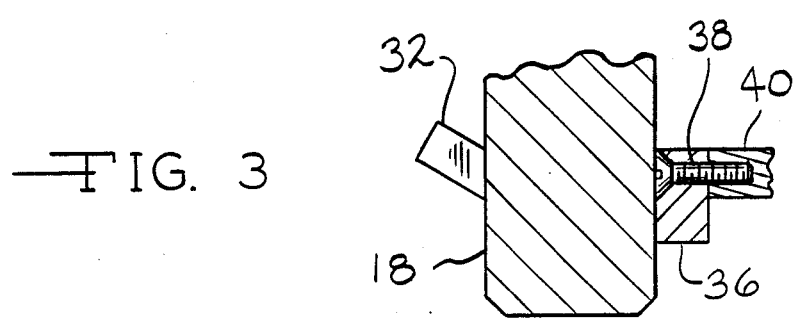
FIG. 3 is a cross sectional view of the hitch pin shown in FIG. 1, taken along the line 3—3.

As shown in FIGS. 2 and 3, when the arm 24 is in the retaining position, the magnet 36 is in contact with the central shaft 18 and exerts an attractive force on said central shaft 18 to maintain the arm 24 in the retaining position under most service conditions. When, in service, the pin 10 encounters an obstruction which overcomes the attractive force exerted by the magnet 36 on the central shaft 18, the arm 24 can pivot out of the retaining position until the pin 10 clears the obstruction and the arm 24 at which time gravity will cause the arm 24 to rotate back to the retaining position.

Figure 4:
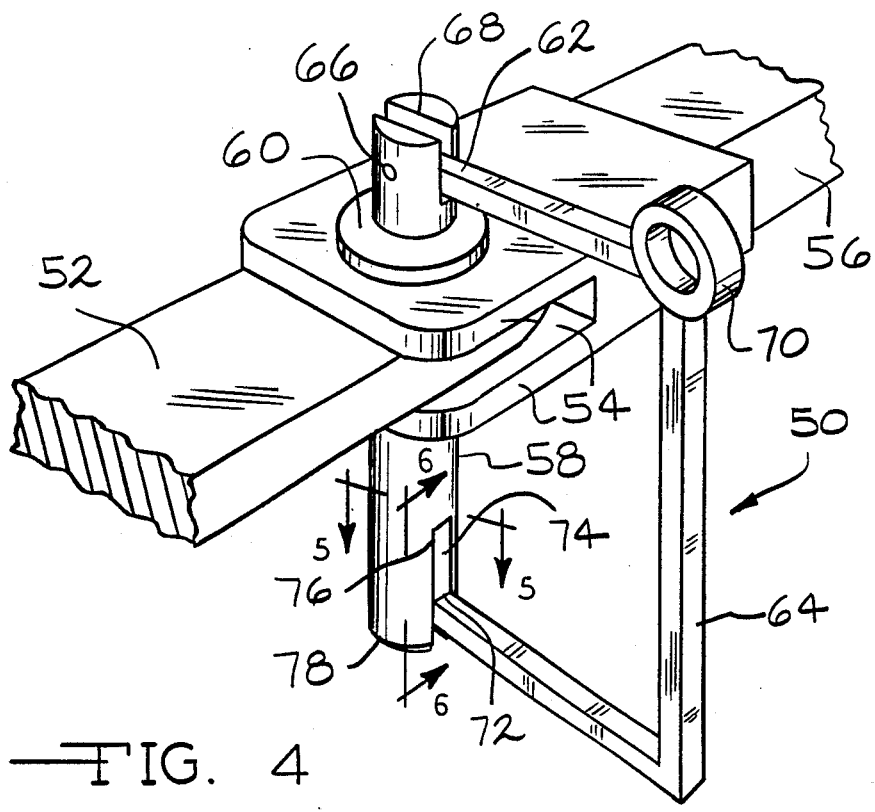
FIG. 4 is a perspective view of a hitch pin according to a second embodiment of my invention.

Referring now to FIG. 4, a hitch pin according to a second embodiment of my invention is indicated generally at 50. The pin 50 is operatively connecting a hitch plate 52 of a towing vehicle (not shown) to forks 54 of a yoke 56 of a towed vehicle (not shown). A central shaft 58 of the pin 50 extends through apertures (not shown) provided in the hitch plate 52 and the forks 54 of the yoke 56. A collar 60 is secured, for example, by welding, to the central shaft 58. The collar 60 has a diameter large enough to prevent the pin 50 from falling through the apertures in the forks 54 and the hitch plate 52.

A first end 62 of a C-shaped retaining arm 64 is pivotally mounted on a pin 66 carried in a first, upper end 68 of the central shaft 58. The C-shaped arm 64 is mounted on the pin 66 for pivotal movement between a first, retaining position illustrated in FIG. 4 and a second, release position (not illustrated). A ring 70 is formed in the arm 64 to facilitate one grasping the arm 64 to move it from the retaining position to the release position.

At a second end 72 of the arm 64, there is a foot portion 74 which is integral with and extends upwardly from the end 72 of the C-shaped arm 64. With the arm 64 in the retaining position, the foot 74 is received in a groove 76 formed in a second, lower end 78 of the central shaft 58. The foot portion 74 and the groove 76 are sized so that the foot portion does not protrude from the groove when the arm is in the first position. Consequently, with the arm 64 in the first position, when the pin 50 is moved upwardly relative to the hitch plate 52 and the yoke 56, the foot portion can enter the apertures therein, thereby positively locking the arm 64 in the first position. Subsequent downward movement of the pin 50 will release the foot portion 74 from the apertures in the hitch plate 52 and the yoke 56 so that the arm 64 can be rotated to the second position.

A magnet 80 is secured in the groove 76 for exerting an attractive force on the foot 74 of the arm 64. In this embodiment, the magnet 80 is retained in the groove 76 by compression, i.e., there is a force fit between the magnet 80 and sidewalls 82 of the groove 76.

Figure 5:
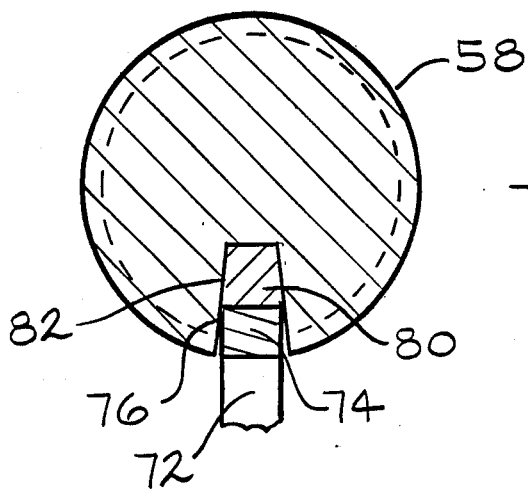
FIG. 5 is a cross sectional view of the hitch pin shown in FIG. 4, taken along the line 5—5.
Figure 6:
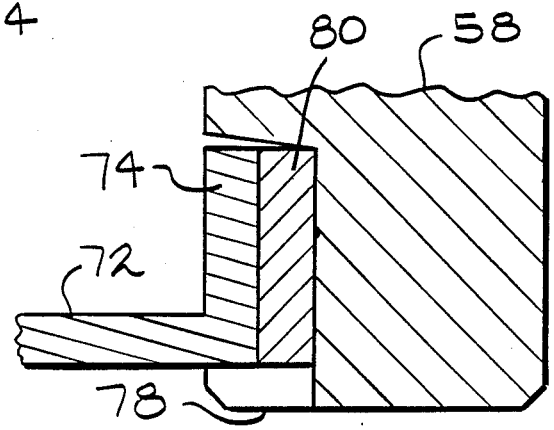
FIG. 6 is a cross sectional view of the hitch pin shown in FIG. 4, taken along the line 6—6.

It will be readily appreciated by those skilled in the art that means other than the threaded fastener 38 and the force fit discussed in connection with FIGS. 4 through 6 can be utilized to secure a magnet to a lower end of a central shaft or a C-shaped arm, in a hitch pin according to the present invention.

I claim:

1. A hitch pin for releasably connecting a towing vehicle to a towed vehicle, wherein the vehicles have members with apertures that can be aligned, said hitch pin comprising
    a cylindrical shaft member having a first end and a second end, said shaft having means defining a slot adjacent to said second end thereof,
    a C-shaped arm member having a first end and a second, distal end opposite said first end,
    a foot portion connected to said second end of said arm member, said foot portion being received in said means defining a slot, when said arm member is in the first position, so that coaction between said foot portion and said means defining a slot restricts lateral movement of said second end of said arm relative to said second end of said shaft,
    pivot means connecting said first end of said shaft member and said first end of said arm member so that said arm member can be rotated, relative to said shaft member, between a first position in which said second end of said arm member engages said second end of said shaft member to restrain removal of the hitch pin from the apertured vehicle members and a second position in which said second end of the arm member is remote from said second end of said shaft member and removal of the hitch pin from the apertured vehicle members is not restrained, and
    magnet means for exerting an attractive force between said second end of said shaft and said foot portion of said arm member, when said arm member is in the first position.

2. The hitch pin claimed in claim 1 wherein said means defining a slot comprises vertically extending sidewalls which converge inwardly and wherein said magnet means comprises a magnet wedged between said sidewalls.

3. The hitch pin claimed in claim 1 wherein said magnet means are supported in the means defining a slot adjacent to said second end of said shaft member.

4. A hitch pin for releasably connecting a towing vehicle to a towed vehicle, wherein the vehicles have members with apertures that can be aligned, said hitch pin comprising
    a cylindrical shaft member having a first end and a second end,
    a C-shaped arm member having a first end and a second, distal end opposite said first end,
    pivot means connecting said first end of said shaft member and said first end of said arm member so that said arm member can be rotated, relative to said shaft member, between a first position in which said second end of said arm member engages said second end of said shaft member to restrain removal of the hitch pin from the apertured vehicle members and a second position in which said second end of the arm member is remote from said second end of said shaft member removal of the hitch pin from the apertured vehicle members is not restrained,
    guide bar means provided on said second end of said arm member for restricting lateral movement thereof relative to said second end of said shaft when said arm member is in the first position, and
    magnet means for exerting an attractive force between said second end of said arm member and said second end of said shaft member, when said arm member is in the first position.

5. The hitch pin claimed in claim 4 wherein said guide bar means comprises at least two guide bars secured to said second end of said arm member and wherein said guide bars straddle said shaft member when said arm member is in the first position.

6. The hitch pin claimed in claim 5 wherein said magnet means are positioned and supported on said arm member between said guide bars.

* * * * *